Figure 1:
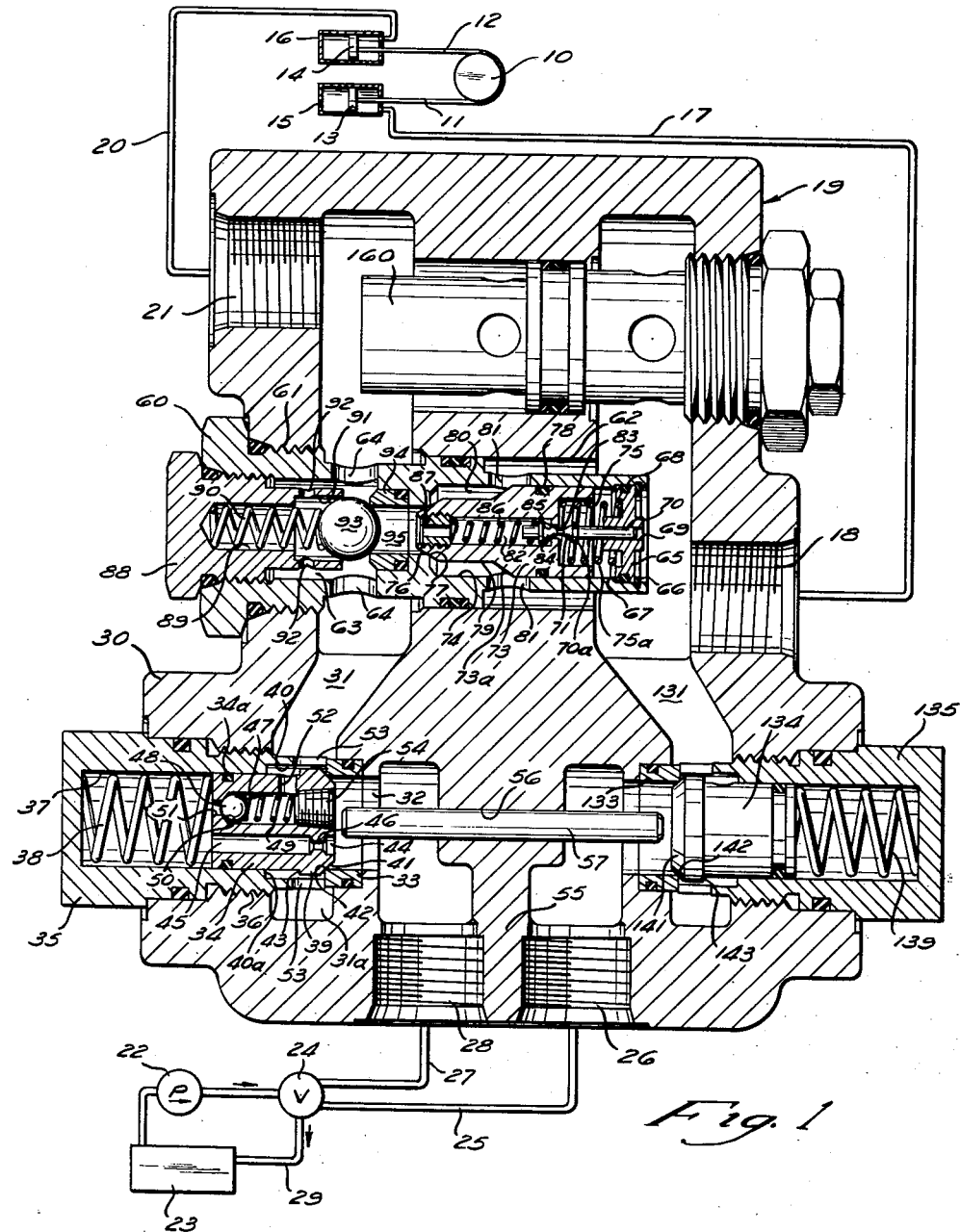

April 21, 1964

J. D. ALLEN ETAL 3,129,720

FLOW CONTROL VALVE

Filed April 7, 1961

2 Sheets-Sheet 1

INVENTORS
JOHN D. ALLEN, &
DONALD A. STREMPLE
BY
RICHEY, McNENNY & FARRINGTON

William J. Flynn
ATTORNEYS

INVENTORS
JOHN D. ALLEN, &
DONALD A. STREMPLE
BY
RICHEY, McNENNY, & FARRINGTON
William J. Flynn
ATTORNEYS

United States Patent Office 3,129,720
Patented Apr. 21, 1964

3,129,720
FLOW CONTROL VALVE
John D. Allen, South Euclid, and Donald A. Stremple, Northfield Center, Ohio, assignors to Fawick Corporation, Cleveland, Ohio, a corporation of Ohio
Filed Apr. 7, 1961, Ser. No. 101,445
4 Claims. (Cl. 137—490)

This invention relates to a flow control valve for controlling the operation of a fluid-actuated device.

In the use of flow control valves for controlling the operation of backhoes, cranes and various other fluid-actuated devices difficulties have been encountered due to the inadvertent operation of the flow control valve in response to back pressure in the line connecting the flow control valve to the fluid-actuated device. For example, when a backhoe is on the side of a hill it tends to swing freely because the resulting back pressure due to its weight tends to operate the flow control valve. A similar undesirable effect may occur in the operation of a crane when a heavy load is placed on the hook as the flow control valve is actuated to lower the hook.

The present invention is directed to a novel flow control valve unit which overcomes this difficulty.

Accordingly, it is an object of this invention to provide a novel and improved flow control valve.

Another object of this invention is to provide such a valve unit having a simplified arrangement for enabling it to operate independent of the back pressure in a line connecting it to the fluid-actuated device which it controls.

It is also an object of this invention to provide such a valve which is adapted to relieve momentary pressure surges and which cannot operate inadvertently due to back pressure.

Further objects and advantages of this invention will be apparent from the following detailed description of two presently-preferred embodiments thereof, which are shown in the accompanying drawings.

Figure 2:
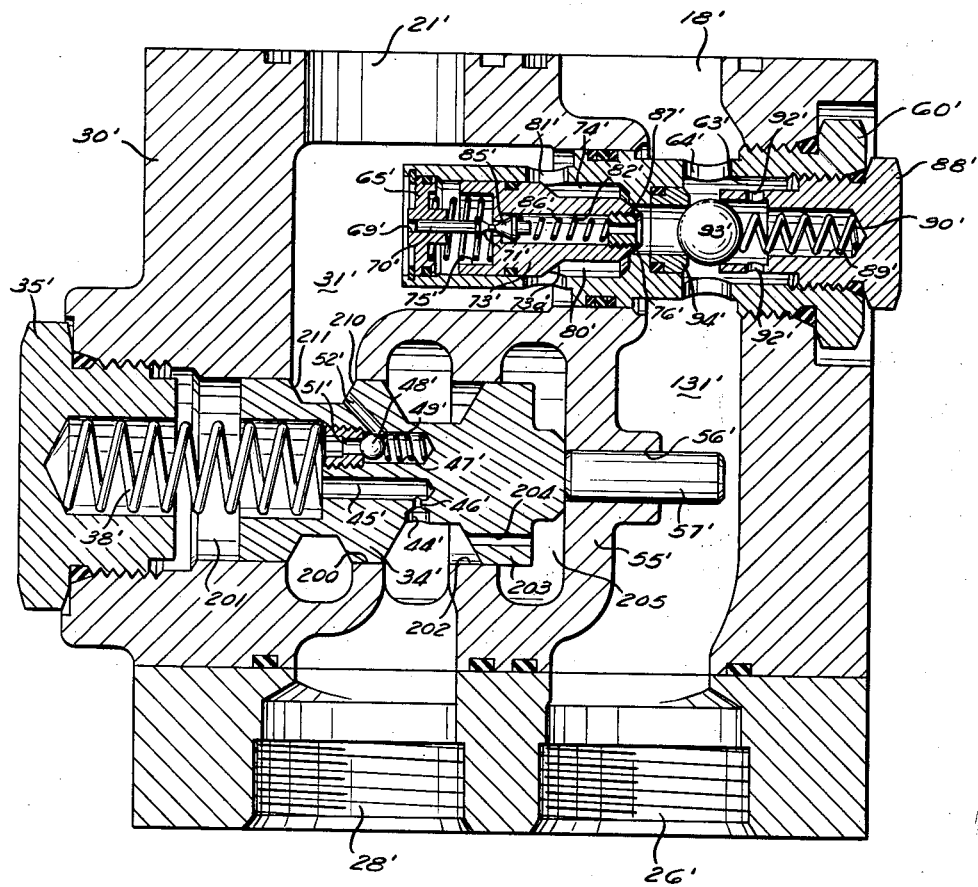

In the drawings:

FIGURE 1 is a section through a first flow control valve unit, in accordance with the present invention, shown connected in a fluid control system for operating a backhoe; and FIGURE 2 is a section through a second flow control valve unit, in accordance with the present invention, suitable for controlling a fluid motor-operated crane.

Referring first to FIGURE 1, the system shown schematically therein comprises a pulley 10 coupled to the pivot post (not shown) of the backhoe. The pulley is operated by flexible cables 11 and 12, which are coupled respectively to pistons 13 and 14 operating in cylinders 15 and 16. A fluid line 17 leading to cylinder 15 is connected to a port 18 of the present flow control valve, designated in its entirety by the reference numeral 19. A fluid line 20 leading to cylinder 16 is connected to another port 21 of the flow control valve 19.

The system also includes a pump 22 for delivering hydraulic fluid from a sump 23 through a manually operable selector valve 24 either to a line 25 leading to a port 26 of the flow control valve 19 or to a line 27 leading to a port 28 of the flow control valve. A return line 29 extends from the selector valve 24 to the sump 23.

In the normal operation of this system, in order to turn the pulley counterclockwise in FIGURE 1, the selector valve 24 is operated to establish communication between the output of pump 22 and line 27. Fluid under pressure flows through the flow control valve 19 from port 28 to port 21, and thence through line 20 to cylinder 16. The resulting pull on cable 12 turns the pulley 10 counterclockwise and also exerts a pull on cable 11 to move piston 13 to the right. As described in detail hereinafter, fluid from cylinder 15 returns through line 17 to the port 18 in the fluid control valve 19 and thence from port 26 through line 25, selector valve 24 and line 29 to the sump 23.

When it is desired to turn the pulley 10 clockwise the selector valve 24 is operated to connect the output of pump 22 to line 25 and to connect line 27 to the sump return line 29, so that the fluid flow takes place in the reverse direction from that just described.

Turning now to the details of the construction and operation of the flow control valve 19 shown in FIGURE 1, the valve comprises a cast body or housing 30 having a passage 31 at its left-hand side for effecting fluid communication between the ports 28 and 21 at that side. Between the port 28 and passage 31 extends a transverse passage 32 at which is located a cylindrical rigid valve seat 33 of suitable metal. A reciprocable poppet 34 is normally positioned for engagement with this valve seat to block the fluid communication between passages 32 and 31.

The poppet 34 is slidably mounted in a thimble or cup-shaped member 35 which is threadedly mounted at 36 in an opening in the left side wall of the valve housing 30. At its back end the poppet 34 is cylindrical and has a close sliding fit in a complementary bore 37 in the thimble. A resilient O-ring 34a of rubber-like material carried by the poppet prevents leakage around this part of the poppet. A coil spring 38 biases the poppet forward (to the right in FIGURE 1) against the valve seat 33.

At its front end the poppet has an enlarged, generally cylindrical head 39 which is loosely received in a counterbore 40 formed in the front end of thimble 35 coaxial with the latter's bore 37. At its extreme front end the poppet presents a frusto-conical face 41 which normally seats against the inside annular corner 42 on the valve seat 33. The bore through the valve seat 33 is the same size as, and coaxial with, the bore 37 in the thimble. The rear extremity of the enlarged head 39 on the poppet presents a rearwardly facing annular shoulder 43 which lies in a plane extending perpendicular to the axis of the poppet.

The poppet is formed with a lengthwise passage comprising opposite end portions 44 and 45 of the same diameter and a reduced diameter flow restriction or orifice 46 joining them.

It will be apparent that with this construction the opposite ends of the poppet present equal areas exposed to the pressure in the bore 32 and the thimble bore 37 respectively, when the poppet is seated against the valve seat 33. Due to the passage 44–46 through the poppet, these pressures are equalized when the poppet is seated. However, due to the flow restriction 46, a relatively small volume flow of fluid through this passage produces a large pressure differential between the front and back ends of the poppet.

The valve housing has a recess 31a which extends around the front end of thimble 35 and is in communication with valve passage 31. Thimble 35 has slots 53 at its extreme front end which effect communication between its counterbore 40 and recess 31a and passage 31. With this arrangement, when the poppet is seated its rearwardly-facing shoulder 43 is exposed to the back pressure in valve passage 31. Also, the annular marginal portion of its inclined front face 41, which extends behind the valve seat corner 42, is exposed to this same pressure. Because these oppositely facing surfaces on the poppet have the same extent, in a direction perpendicular to the poppet axis, the opposing fluid forces at these surfaces offset one another, so that in this position the poppet is balanced with respect to the back pressure in valve passage 31. That is, this back pressure does not tend to move the poppet in either direction, regardless of the magnitude of this back pressure.

The poppet also is formed with a bore 47 in which is located a ball 48 which is biased rearwardly by a spring 49 against a frusto-conical seat 50. A smaller bore 51 extends from this seat into the thimble bore 37 behind the poppet. A screw 54 is provided for retaining spring 49 in place. The poppet also has a transverse opening 52 extending from the bore 47 and leading into the counterbore 40 in the thimble.

At the opposite side the valve housing has a passage 131 for effecting fluid communication between the ports 26 and 18 at that side. A valve seat 133, a spring-biased poppet 134, and a poppet-receiving thimble 135 are provided at this side of the valve. These elements are identical in construction, and the operation is the same, as for the corresponding elements at the left-hand side of the unit. For simplicity the poppet 134 is shown in elevation and will not be described in detail.

The valve housing has an internal wall 55 separating the bores 28 and 26. Opposite the valve seats 33 and 133 this wall is relatively thick and is formed with a bore 56 in which a piston or plunger 57 is slidable. The length of this piston is less than the spacing between the front faces of the respective poppets 34 and 134 when the latter are seated against the respective seats 33 and 133. Normally, with both poppets seated, as shown in FIGURE 1, the piston is positioned midway between them.

In operation, when the selector valve 24 is actuated to connect the output of pump 22 to line 27 the pump pressure produces a momentary unbalancing of the poppet 34, causing the latter to move to the left in FIGURE 1 away from the valve seat 33. This unbalance is due to the flow restriction 46 in the poppet passage, which produces a large pressure differential between the front and back ends of the poppet due to the flow of fluid through it. As the poppet moves to the left, the pressure behind the poppet is relieved because the ball check 48 opens and permits the flow of fluid from behind the poppet through bore 47 and the transverse ports 52, 53 into valve passage 31.

The small volume flow of fluid through passage 44–46 and thence past ball check 48 to outlet passage 31 is effective to maintain poppet 34 open, as long as this flow continues. When the poppet is retracted, as described, its transverse opening 52 remains open to valve passage 31 so that the small volume flow of fluid through poppet passage 44–46 and thence past ball check 48 to valve passage 31 is maintained.

With the poppet 34 in its retracted, or open, position the hydraulic fluid has substantially unrestricted flow past this poppet into valve passage 31. From here it flows out the port 21 and thence through line 20 to cylinder 16.

During this time the other poppet 134 has remained closed. Until it opens, the pressure in cylinder 15 cannot be relieved and therefore the pulley 10 cannot be turned in response to the pump pressure applied to cylinder 16. Because of this, the back pressure at port 28 increases until it is effective to move the plunger 57 to the right and then unseat the poppet 134, to thereby relieve the pressure in cylinder 15 by way of line 17, valve port 18, valve passage 131, past poppet 134, through valve port 26, line 25, selector valve 24 and return line 29 to the sump 23.

The delay in the opening of the poppet 134 under the circumstances described takes place because this poppet opens independent of the back pressure in passage 131. As shown in FIGURE 1 the rearwardly-facing shoulder 143 on the poppet 134 is exposed to the back pressure in passage 131, as is the annular marginal portion of its inclined front face 141 which projects laterally beyond the corner 142 of the valve seat. The exposed portion of this inclined front face 141 has the same extent in a direction radially from the axis of poppet 134 as does the radially disposed annular shoulder 143. Therefore, the fluid forces exerted on these opposite faces of the poppet are equal and opposite, regardless of the magnitude of the fluid pressure in passage 131.

Therefore, the seating force on poppet 134 is determined solely by spring 139. When the force exerted by plunger 57 is sufficient to overcome this spring, then poppet 134 will open.

Due to this arrangement the fluid lines to and from the respective cylinders 16 and 15 remain filled at all times, thereby maintaining tension on both pulley cables 12 and 11 at all times.

In the event that the fluid-actuated device, such as a backhoe, is on the side of a hill, its weight cannot cause the pulley 10 to turn because neither poppet will open in response to back pressure.

Assuming that the pump 22 has been supplying fluid under pressure to cylinder 16, as described, when the selector valve 24 is operated to disconnect the pump output from line 27 the following happens:

The pressure at port 28 drops to a value such that the fluid flow through poppet passage 44–46 and past ball check 48 to valve passage 31 is overcome by the opposing force exerted by ball check spring 49. Therefore, this spring closes ball check 48. This terminates the pressure unbalance on poppet 34 and permits spring 38 to move the poppet to its closed position.

At the same time, the reduction in pressure at port 28 also reduces the fluid force on plunger 57 tending to maintain poppet 134 open. Therefore, spring 139 overcomes this reduced opposing fluid force and moves poppet 134 to its closed position.

In case the selector valve 24 is operated to cause pulley 10 to turn clockwise, then the fluid flow through the valve 19 and the operation of the valve are the reverse of what has just been described.

The flow control valve unit of FIGURE 1 also includes a cushion valve arrangement to relieve momentary pressure surges.

To this end there is provided a cushion valve cartridge 60 which is threadedly mounted at 61 in the left hand side wall of the valve housing 30. This cushion valve is connected to relieve pressures surges in passage 131. An identical, oppositely mounted cushion valve 160 is arranged to relieve pressure surges in passage 31.

Cartridge 60 extends transversely across the passage 31 and is mounted in fluid-tight fashion in a transverse bore 62 in the valve housing extending between the latter's passages 31 and 131. The cushion valve cartridge has an annular chamber 63 which communicates through ports 64 with the valve passage 31. The extreme inner end of the cushion valve cartridge 60 extends into the valve passage 131 at the right side of the valve body.

At this end the cartridge carries an end plate 65 held in position by a snap ring 66 and sealed to the bore 67 of the cartridge by means of a rubber O-ring 68. This end plate is formed with an axial bore 69 in which a pin 70 has a loose sliding fit. This pin projects beyond the inner side of end plate 65 and at its extreme inner end carries a head 71 terminating in a reduced nose 72. A snap ring 70a on pin 70 prevents it from dropping out through bore 69 in any position of the cartridge.

A main cushion valve member 73 is slidable in a bore 74 formed in cartridge 60. This valve member has a cylindrical recess 75 at its back end. A coil spring 75a is engaged under compression between the inner side of end plate 65 and the back end of valve member 73 at this recess. This spring biases valve member 73 to the left in FIGURE 1. At its front end valve member 73 has a frusto-conical nose 76 which normally seats against a circular inside corner 77 on the cartridge 60 at the inner end of the bore 74 therein.

Valve member 73 carries a rubber O-ring 78 for sealing engagement with the wall of cartridge bore 74. Just behind its front end nose 76 the valve member 73 has a cylindrical portion 79 which is substantially smaller in diameter than the cartridge bore 74, so that there is an annular space 80 within this bore surrounding the valve portion 79. This space 80 communicates through openings 81 in the cartridge with the valve body bore 62 opening into the valve passage 131. Valve member 73 presents a tapered annular face 73a at this location.

Valve member 73 is formed with an axial passage 82 which terminates at its right end in a smaller opening 83 leading its back end recess 75. A small poppet valve member 84 is disposed in passage 82, presenting a tapered end for sealing engagement with the annular inside corner 85 at the juncture between passage 82 and opening 83. A coil spring 86 biases poppet valve member 84 to this position. An annular adjusting screw 87 having a hex socket is threaded into the front end of passage 82 and is adjustable to vary the biasing force on poppet valve member 84.

The cushion valve cartridge 60 at its left end carries a threadedly mounted thimble 88 extending into the bore 63 in the cartridge. Thimble 88 has a bore 89 in which is seated a compression spring 90. The inner end of thimble 88 has a counterbore 91 and openings 92 leading into this counterbore from the cartridge bore 63. A valve ball 93 is biased by spring 90 against an annular valve seat 94 having a passage 95 open toward the inner end of valve member 73.

Whenever ball 93 is unseated, against the bias exerted by its spring 90, passage 95 is open to passage 31 in valve body 30.

The purpose of valve ball 93 is to prevent the cushion valve member 73 from opening due to back pressure in passage 31. It will be apparent that ball 93 is exposed to such back pressure completely across its surface which faces away from valve seat 94, so that it will seat more tightly as the back pressure increases.

The overall purpose of this cushion valve is to provide for the relief of fluid pressure from passage 131 at the right side of valve body 30 back to passage 31 at the other side in the event of a high pressure surge in passage 131.

In operation, under normal conditions valve member 73 stays seated against valve seat 77. This is because the fluid force acting on its face 73a, and tending to unseat it, is overcome by the combined forces of spring 75a and the same fluid pressure acting against the larger area of the entire back end of valve member 73. Due to leakage of fluid past the pin 70, the fluid pressure acting against the back end of valve member 73 will be the same as the pressure in passage 131 normally. This condition is shown in FIGURE 1.

When there is a high pressure surge in passage 131, it will move pin 70 to the left, opening poppet 85 so that the fluid pressure acting against the back end of valve member 73 can be relieved through passage 82 in the latter, through the passage in screw 87, through the valve seat passage 95 and past ball 93 to passage 31.

Due to this pressure reduction at the back end of valve member 73, the higher fluid pressure acting against the smaller area face 73a will be effective to move valve member 73 to the right, unseating it to provide for the rapid unloading of fluid pressure from passage 131 to passage 31. This condition will prevail until the pressure in passage 131 has dropped to a safe value. During this time, the fluid pressure acting against the back end of valve member 73 will stay reduced because of the flow restriction provided by the clearance between pin 70 and bore 69, which creates a pressure differential between passage 131 and the space between end plate 65 and the back end of valve member 73.

From the foregoing it will be evident that this cushion valve provides for the quick and effective relief of pressure surges in passage 131. At the same time, it cannot open as a result of back pressure in passage 31.

An identical cushion valve 160 is mounted in reverse fashion with respect to passages 31 and 131 in the valve body, so as to provide for surge pressure relief from passage 31 back to passage 131. This cushion valve 160 also includes a ball check which prevents it from opening in response to back pressure in passage 131.

FIGURE 2 illustrates a second embodiment of this invention which is especially adapted for use on a crane having a hydraulic motor to wind the lifting cable.

This valve has a cushion valve identical to the cushion valves in the FIGURE 1 embodiment. This cushion valve is arranged to relieve high pressure surges in valve passage 31'. Corresponding elements of this cushion valve are given the same reference numerals as in FIGURE 1, with a "prime" added. Since the operation of this cushion valve is the same as described in detail in connection with FIGURE 1, the description will not be repeated.

In the valve construction shown in FIGURE 2, the valve body 30' has ports and passages 28', 31', 21', 18', 131' and 26' corresponding to the correspondingly numbered ports and passages in the FIGURE 1 valve. A reciprocable spool valve 34' controls the fluid communication between port 28' and passage 31'. This spool valve has a cylindrical portion which normally seals against a cylindrical valve seat surface 200 on valve body 30'. Spring 38' normally biases spool valve 34' to this position, as shown in FIGURE 1.

The spool valve has an internal passage 44'–46', having a flow restriction 46' and leading from the port 28' to a chamber 201 at the back end of the spool valve. The spool valve also has a second passage 51', 47', 52' leading from its back end to valve body passage 31' and normally closed by a spring-biased ball check 48'.

As shown in FIGURE 2, in its closed position the spool valve presents tapered annular faces 210 and 211 which present substantially equal areas exposed to the back pressure in passage 31'. The oppositely directed fluid forces acting on these faces cancel one another, regardless of the magnitude of this back pressure, so that the spool valve is fluid pressure balanced when closed. Spring 38' maintains it closed. No change in the back pressure in passage 31' will cause the spool valve to open.

At the opposite side of valve seat 200 the valve body 30' presents a cylindrical opening 202 which slidably receives a cylindrical enlargement 203 on the spool. A passage 204 through this enlargement provides fluid communication between port 28' and an annular recess 205 in the valve body. In the normal, closed position of the spool valve 34', its right end abuts against an internal wall 55' of the valve body, which separates the valve body passages 31' and 131'.

An opening 56' through this wall slidably receives a piston 57', which is exposed to the pressure in passage 131'.

When used in conjunction with a crane having a lifting cable operated by a fluid motor, the valve of FIGURE 2 has its port 28' connected to the output of the pump, its port 21' connected to the input of the fluid motor, its port 18' connected to the output of the fluid motor, and its port 26' connected to the sump when the fluid motor is to be operated to raise the cable. Under these conditions the pump pressure will open spool valve 34', due to the resulting pressure unbalance on the spool valve, to pass fluid from the pump to the input of the fluid motor.

When the fluid motor is to be operated to lower the cable, its direction of rotation must be reversed. This is done by connecting the pump output to the valve port 26' and connecting valve port 28' to the sump. Initially, spool valve 34' will remain closed when the fluid motor is so connected; the pressure in passage 31' cannot open the spool valve, as explained already. However, with the spool valve closed, the pressure at valve passage 131' will increase to a value such that piston 57' will be moved to the left and will open spool valve 34' against the bias of spring 38'.

In the event that a heavy load is placed on the cable when the latter is to be lowered, the spool valve 34' and piston 57' operate to prevent the load from running away from the fluid motor, i.e., causing the fluid motor to turn faster than the pump pressure can be supplied to operate it. In such event, the pump pressure at valve passage 131' will decrease sufficiently to enable spool valve 34' to close under the urging of spring 38', thereby shutting off the output line from the fluid motor to cause the latter to slow down until the pump pressure again builds up to the required value.

If, while a heavy load is being lowered, the fluid motor is stopped suddenly, this may produce a high pressure surge in valve passage 31'. If this happens, the cushion valve will bypass the fluid flow from passage 31' back to passage 131'.

Neither of these problems (i.e., motor run-away and shock loading) can occur when a load is being lifted. Therefore, only a single flow control valve and cushion valve need be provided in the valve arrangement used in conjunction with a crane.

From the foregoing description, it will be apparent that each of the illustrated embodiments is well-adapted to accomplish the objects of this invention. However, it is to be understood that, while two presently-preferred embodiments of the invention have been disclosed in detail, various modifications, omissions and refinements which depart from the disclosed embodiments may be adopted without departing from the spirit and scope of this invention.

What is claimed is:

1. A valve comprising a housing body having a pair of passages and a valve seat between said passages, said housing body having an additional passage separate from said pair of passages, a valve member movable between a closed position at said valve seat for preventing the flow of fluid between said pair of passages and an open position away from said valve seat for permitting the flow of fluid between said pair of passages, said valve member having means for pressure balancing it by the fluid pressure in one of said pair of passages when in its closed position, spring means biasing said valve member to its closed position, said valve member having means, separate from and independent of said additional passage, for pressure unbalancing it to move it to its open position in response to fluid pressure at the other of said pair of passages, and a plunger, separate from and independent of said last-mentioned means, exposed to the pressure in said additional passage and engageable with said valve member to move the latter to its open position against the bias of said spring means when the fluid pressure in said additional passage rises to a predetermined value.

2. A valve comprising a housing body having first and second passages and a valve seat between said passages, a valve member slidable lengthwise between a closed position at said valve seat and an open position away from said valve seat, said valve member having a front face exposed to the fluid pressure in said first passage and an opposite back end face spaced from said first passage in a direction lengthwise of the valve member, means defining a fluid chamber at said back face of said valve member, said valve member having a first internal passage therein extending from said front face to said back face and having a flow restriction to produce a pressure unbalance on said valve member in response to the flow of fluid through said internal passage from said first housing body passage to said fluid chamber, said valve member having a second internal passage therein extending from said fluid chamber to said second housing body passage, a normally closed check valve in said second internal passage permitting the flow of fluid from said fluid chamber to said second housing body passage but preventing the flow of fluid from said second housing body passage to said fluid chamber, said valve member having oppositely facing surfaces exposed to the fluid pressure in said second housing body passage which provide equal and opposing forces on said valve member due to the fluid pressure in said second housing body passage, spring means biasing said valve member to its closed position, said housing body having an additional passage separate from said first and second passages, and a plunger exposed to the fluid pressure in said additional passage and engageable with said valve member to move the latter to its open position against the bias of said spring means when the fluid pressure in said additional passage rises to a predetermined value.

3. The valve of claim 2 wherein said valve member is a poppet having a tapered front face engageable with said valve seat to block the flow of fluid between said first and second housing body passages, said tapered front face on the poppet having an annular marginal portion which is exposed to the fluid pressure in said second housing body passage when the front face of the poppet engages said valve seat, said poppet having a rearwardly-facing annular marginal shoulder spaced behind its front face and having an extent perpendicular to the direction of movement of the poppet equal to the corresponding extent of said marginal portion of the front face, whereby the poppet is pressure balanced by the fluid pressure in said second housing body passage regardless of the magnitude of said pressure, and said second internal passage in the poppet opens into said second housing body passage behind said shoulder.

4. The valve of claim 2 wherein said valve seat is constituted by a cylindrical internal surface of the housing body, and said valve member is a spool having a cylindrical segment which is slidable over said valve seat in sealing engagement therewith, said spool having a pair of oppositely-facing annular marginal surfaces behind said cylindrical segment which are exposed to the fluid pressure in said second housing body passage, said oppositely-facing surfaces having substantially equal extents perpendicular to the axis of the spool, whereby the spool is pressure balanced by the fluid pressure in said second housing body passage, and said second internal passage in the spool opens into said second housing body passage behind said cylindrical segment of the spool.

References Cited in the file of this patent

UNITED STATES PATENTS

| 2,410,375 | Wright | Oct. 29, 1946 |
| 2,498,542 | Gardiner | Feb. 21, 1950 |
| 2,689,583 | Gardiner | Sept. 21, 1954 |
| 2,870,781 | Tennis | Jan. 27, 1959 |
| 2,954,011 | Krehbiel | Sept. 27, 1960 |
| 2,954,052 | Krehbiel | Sept. 27, 1960 |
| 2,980,136 | Krehbiel | Apr. 18, 1961 |